No. 708,376. Patented Sept. 2, 1902.
A. L. LUNDGREN.
SQUARE.
(Application filed Feb. 14, 1902.)
(No Model.) 2 Sheets—Sheet 1.
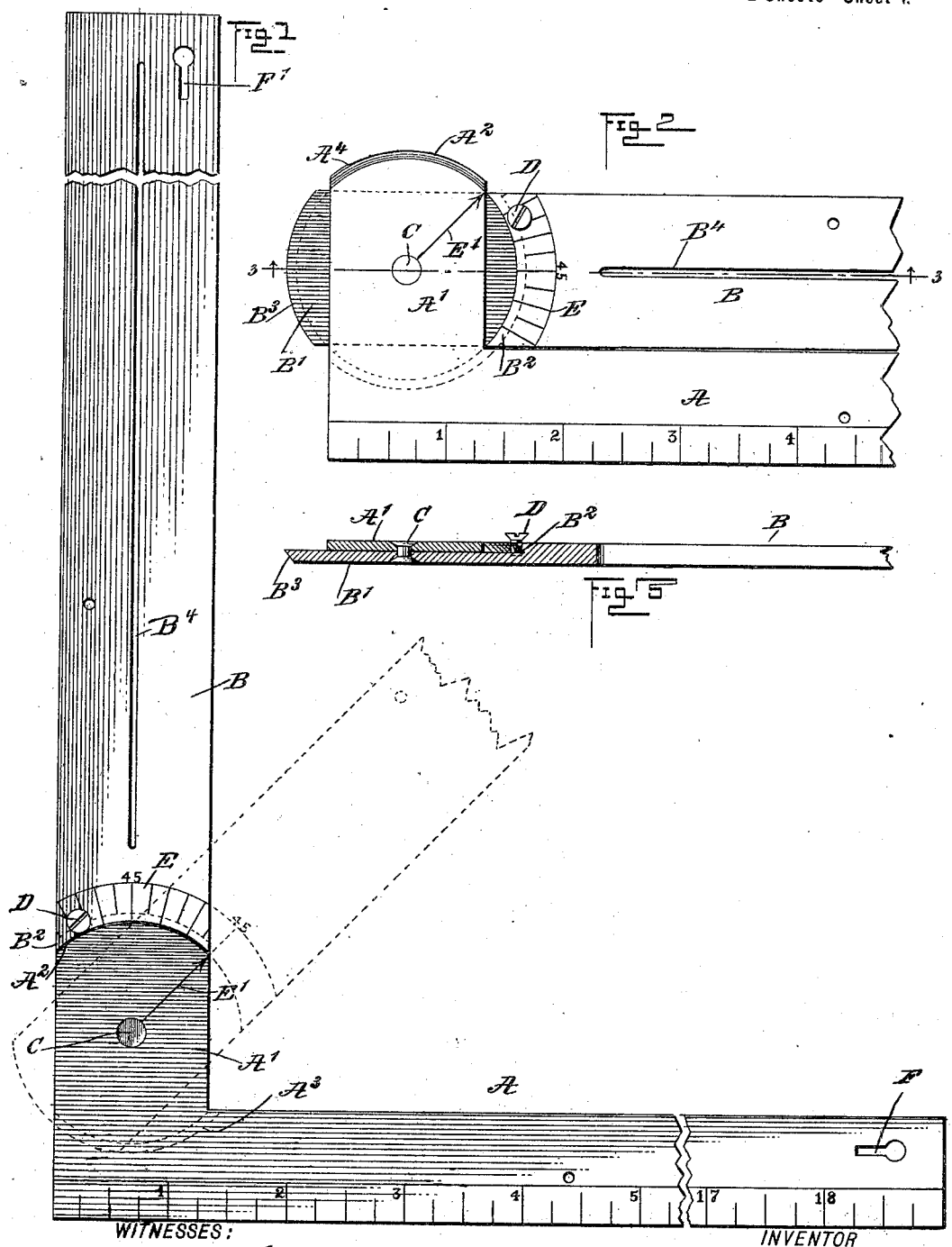
WITNESSES:
INVENTOR
Axel L. Lundgren
BY
ATTORNEYS No. 708,376. Patented Sept. 2, 1902.
A. L. LUNDGREN.
SQUARE.
(Application filed Feb. 14, 1902.)
(No Model.) 2 Sheets—Sheet 2.
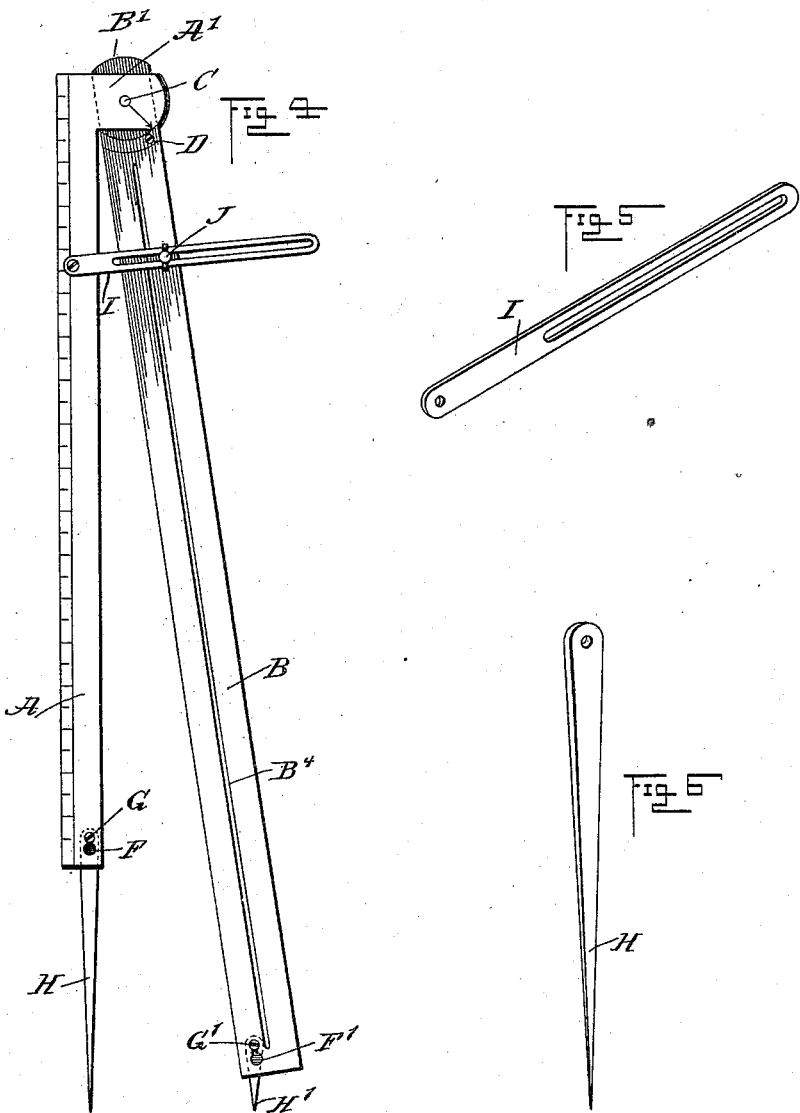
WITNESSES:
INVENTOR
Axel L. Lundgren
BY
ATTORNEYS

UNITED STATES PATENT OFFICE.

AXEL L. LUNDGREN, OF PULLMAN, ILLINOIS.

SQUARE.

SPECIFICATION forming part of Letters Patent No. 708,376, dated September 2, 1902.

Application filed February 14, 1902. Serial No. 94,030. (No model.)

*To all whom it may concern:*

Be it known that I, AXEL L. LUNDGREN, a citizen of the United States, and a resident of Pullman, Chicago, in the county of Cook and State of Illinois, have invented a new and Improved Square, of which the following is a full, clear, and exact description.

The invention relates to drawing and measuring instruments; and its object is to provide a new and improved square for the use of carpenters and other mechanics and arranged for convenient adjustment to give a desired angle and adapted to be folded into a comparatively small space.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a face view of the improvement. Fig. 2 is a like view of the same folded. Fig. 3 is a sectional side elevation of the same on the line 3 3 of Fig. 2. Fig. 4 is a reduced side elevation of the improvement arranged as a compass. Fig. 5 is an enlarged perspective view of the connecting-bar for the legs of the compass, and Fig. 6 is a perspective view of one of the removable leg-points.

The square consists, essentially, of the two members or legs A and B, of which the member A is formed at one end with an angular offset A', connected by a pivot C with the inner end B' of the member B, the said offset A' and the said end B' being reduced in thickness on their contacting inner faces, so that the outer faces of the members are flush with each other, as will be readily understood by reference to Fig. 3. The outer edge $A^2$ of the offset A' is segmental and beveled to engage a segmental undercut or bearing $B^2$, formed on the member B, and the pivotal end $B^3$ of the member B' is also segmental and beveled to engage a correspondingly-shaped undercut or bearing $A^3$ on the offset A', the said bearing serving to hold the members in proper position. The end $A^2$ is formed with a shoulder $A^4$, (see Fig. 2,) adapted to abut against a stop-pin D, secured in the member B to limit the swinging motion of the members A and B relative to each other, it being understood that when the shoulder $A^4$ and stop-pin D engage one another then the members A and B stand at right angles to each other. The face of the member B at the bearing $B^2$ is provided with a graduation E, indicating degrees and subdivisions, and on the said graduation indicates a line or mark E', arranged on the offset A'. Thus when the members A and B are swung toward each other the mark E' indicates on the graduation E the angle at which the members A and B stand to each other, (see dotted line, Fig. 1,) and the angular line to be drawn along the member B is drawn along the slot $B^4$, formed in the member B and standing radially to the pivot C.

The outer ends of the members A and B are provided with bayonet-slots F and F', adapted to receive headed pins G and G', secured on points H and H' (see Fig. 4) to allow of using the instrument as a compass. On the member A is pivoted a slotted connecting-bar I, adapted to be fastened to the other member B by a suitable clamping device J to lock the members A and B in position after the same have been adjusted to draw a circle of a desired radius.

Having thus described my invention, I claim as new and desire to secure by Letters Patent—

1. A square, comprising two members pivoted together, one member being provided with an angular offset having a segmental and beveled end, and with a segmental undercut or bearing, and the other member having its pivoted end segmental and beveled and provided with a segmental undercut, as set forth.

2. A square, comprising two members pivoted together, the pivotal ends of the members being reduced at their inner contacting faces, one member being provided with a segmental and beveled end and with a segmental undercut, and the other member having its pivoted end segmental and beveled and provided with a segmental undercut, as set forth.

3. A square, comprising a member having an angular offset, said offset being reduced in thickness and having a segmental and beveled end, a segmental undercut and an index, and a longitudinally-slotted member having one end reduced in thickness and pivoted to the angular offset of the first member, the reduced portion having a segmental and beveled end and provided with a segmental undercut and with a graduation adjacent to said undercut, as set forth.

4. A square comprising a member provided at one end with an angular offset having a beveled end and an undercut at its opposite end, the said offset being provided with an index, and a longitudinally-slotted member longer than the first member and having one end pivoted thereto, said slotted member having its end beveled and provided with an undercut opposite the beveled end and a graduation at said undercut, the said members being provided with stops to limit the swinging movement thereof, as set forth.

5. A square, comprising two members of unequal length and pivoted together, each member being provided at its free end with a keyhole-slot, and points of unequal length and provided with headed pins for engaging the slots of the members, as set forth.

In testimony whereof I have signed my name to this specification in the presence of two subscribing witnesses.

AXEL L. LUNDGREN.

Witnesses:
GEO. R. HILLSTROM,
JOHN M. COCHRANE.